United States Patent [19]

Heitmann et al.

[11] 4,121,595
[45] Oct. 24, 1978

[54] APPARATUS FOR INCREASING THE PERMEABILITY OF WRAPPING MATERIAL FOR ROD-SHAPED SMOKERS PRODUCTS

[75] Inventors: Uwe Heitmann, Schwarzenbek, Fed. Rep. of Germany; Joachim Buchegger, Richmond, Va.

[73] Assignee: Hauni-Werke Körber & Co. Kg., Fed. Rep. of Germany

[21] Appl. No.: 766,927

[22] Filed: Feb. 9, 1977

[51] Int. Cl.² ............................................. A24B 7/14
[52] U.S. Cl. .................................. 131/21 R; 131/36; 219/12 EB; 219/121 L
[58] Field of Search ................... 131/21 R, 15, 21 A; 219/384, 121 EB, 121 EM, 121 L, 121 LM

[56] References Cited
U.S. PATENT DOCUMENTS

| 3,291,136 | 12/1966 | Boyer | 131/15 B |
| 3,419,321 | 12/1968 | Barber et al. | 219/384 |
| 3,808,394 | 4/1974 | Mominee et al. | 219/121 LM |
| 4,013,261 | 3/1977 | Steigerwald et al. | 219/121 EB |
| 4,032,743 | 6/1977 | Erbach et al. | 219/384 |

Primary Examiner—Robert W. Michell
Assistant Examiner—Millin, Jr., V.
Attorney, Agent, or Firm—Peter K. Kontler

[57] ABSTRACT

Webs which are to be converted into wrappers for filter rod sections, cigars, cigarillos or cigarettes, or the wrappers of such articles, are perforated by one or more laser beams in the machine wherein the articles are produced. The permeability of wrappers can be changed by increasing or reducing the number of holes and/or by increasing or reducing the size of holes in each wrapper. The permeability of the wrappers of finished articles is monitored and the intensity of laser beam or beams is automatically adjusted when the monitored permeability deviates from a desired value. The perforations are formed for the purpose of admitting cool atmospheric air which influences the quantity of nicotine and condensate in the column of smoke. The perforations are disposed close to or in the filter plugs of filter cigarettes, cigars or cigarillos, or close to one or both ends of each filter rod section or plain cigarette, depending on the length of such articles.

11 Claims, 12 Drawing Figures

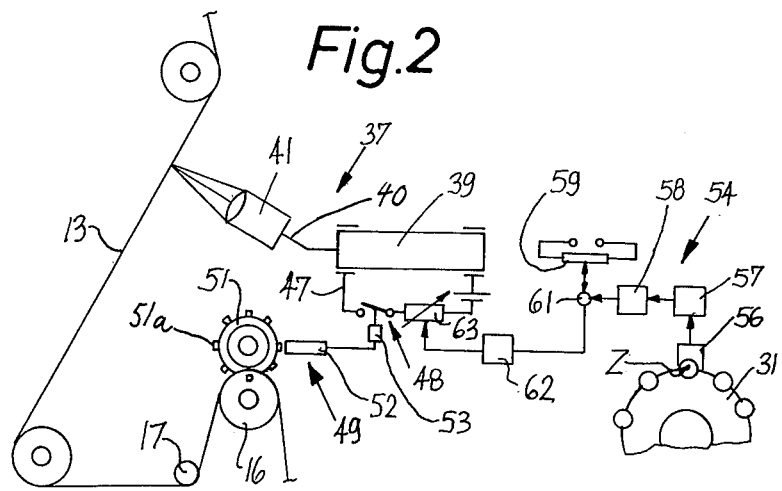
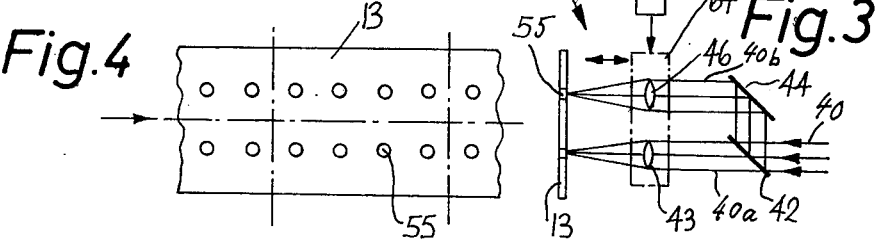
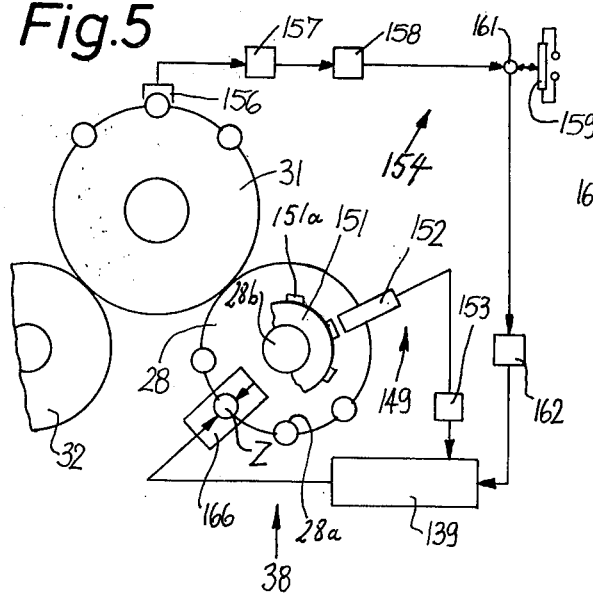

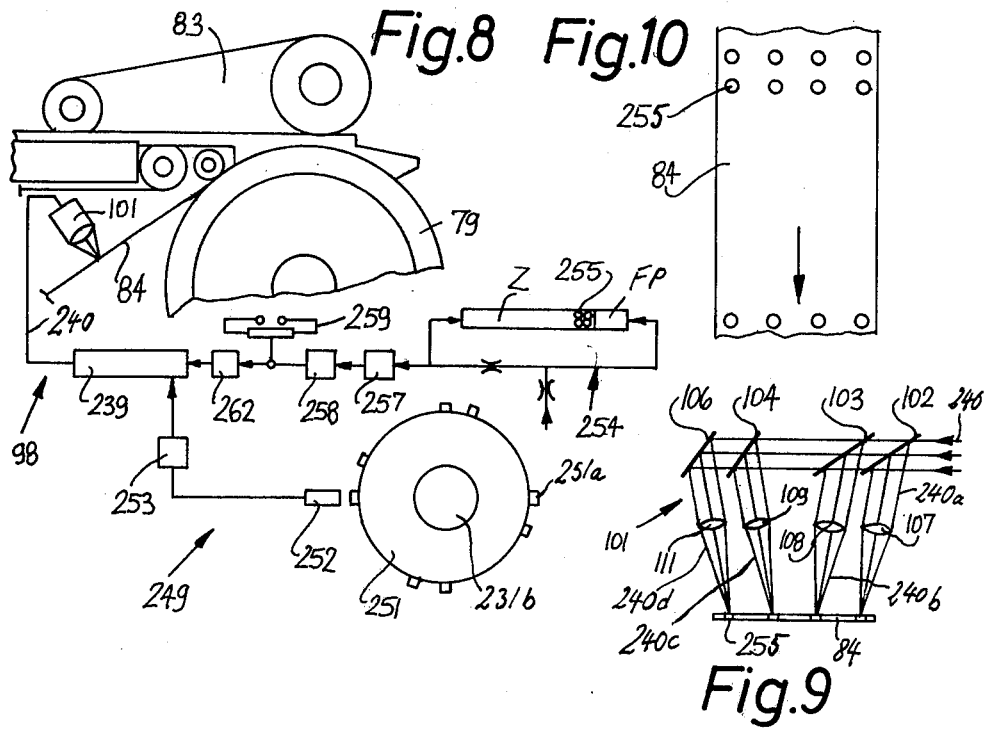
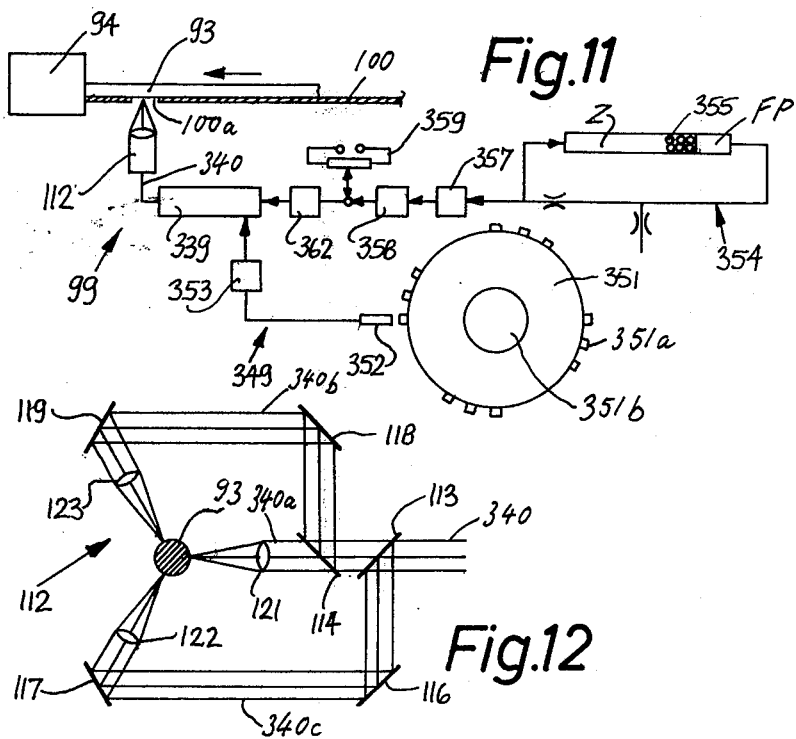

APPARATUS FOR INCREASING THE PERMEABILITY OF WRAPPING MATERIAL FOR ROD-SHAPED SMOKERS PRODUCTS

BACKGROUND OF THE INVENTION

The present invention relates to apparatus for increasing the permeability of wrapping material for rod-shaped smokers' products including tobacco rods, filter rods, filter rod sections and plain or filter tipped cigarettes, cigars and cigarillos. More particularly, the invention relates to apparatus for increasing the permeability of wrappers of such rod-shaped articles in the machine or machines wherein the articles are produced.

It is already known to provide the wrappers of filter cigarettes or like rod-shaped smokers' products with holes or perforations which allow cool atmospheric air to enter the column of tobacco smoke. As a rule, filter tipped smokers' products are perforated in the region of their filter plugs to insure that atmospheric air can enter the column of tobacco smoke irrespective of the length of combusted portion of the tobacco-containing section of the product. The admission of cool atmospheric air into tobacco smoke reduces the harmful effects of smoke because it influences the quantity of nicotine and condensate. It is desirable to regulate the permeability of wrappers of all articles of a given brand in such a way that the permeability is constant or deviates only negligibly from a predetermined value which guarantees maximum beneficial effect of cool atmospheric air upon the column of hot tobacco smoke that flows into the mouth.

Heretofore known proposals to regulate the permeability of wrappers for filter cigarettes or the like include the provision of mechanical perforating devices which puncture the wrappers, for example, during rolling of plain cigarettes and filter plugs to convert such articles into filter cigarettes of unit length or multiple unit length. The perforating devices normally comprise needles whose tips extend into the path of movement of successive wrappers and puncture the wrappers in the region of filter plugs or directly in the filter plugs. The needles are subjected to pronounced wear, especially in a modern high-speed maker which is capable of turning out up to and in excess of 70 articles per second. As the wear upon the needles progresses, the size of each hole increases and the percentage of admitted cool atmospheric air also increases. Therefore, the perforating mechanism must be equipped with adjusting means which compensates for the wear upon the needles. Reference may be had to commonly owned copending patent application Ser. No. 735,166 filed Oct. 26, 1976 by Alfred Hinzmann. Alternatively, the needles must be replaced at frequent intervals which entails lengthy interruptions in operation of the maker.

OBJECTS AND SUMMARY OF THE INVENTION

An object of the invention is to provide a machine for the production and/or processing of rod-shaped smokers' products wherein the permeability of wrappers of such products can be regulated without any wear upon the parts which influence the permeability of wrappers.

Another object of the invention is to provide a machine of the above outlined character wherein the permeability of wrappers can be regulated with a high degree of accuracy and reproducibility, and wherein the provision of permeability regulating means adds little to the bulk of the machine.

A further object of the invention is to provide a novel and improved apparatus which increases the permeability of wrappers of rod-shaped smokers' products and which can be installed in existing machines for the production of filter rod sections or plain or filter tipped cigarettes, cigars or cigarillos.

An additional object of the invention is to provide the apparatus with novel and improved means for perforating the wrappers of rod-shaped smokers' products.

An ancillary object of the invention is to provide the apparatus with novel and improved means for varying the size of holes in the wrappers of rod-shaped smokers' products.

The invention is embodied in a machine for the production and/or processing of rod-shaped articles which constitute or form part of smokers' products and wherein a wrapper surrounds a filler of fibrous material. The machine may serve for the production of plain cigarettes, cigarillos or cigars, for the production of filter rods which can be subdivided into filter rod sections or filter plugs of desired length, or for the production of filter cigarettes, cigars or cigarillos.

The improved machine comprises drive means (e.g., a pair of advancing rolls, a rotary drum-shaped conveyor or a garniture tape) which moves a succession of wrappers along a predetermined path (such wrappers may constitute successive unit lengths of a continuous web of wrapping material, successive unit lengths of the tubular envelope of a continuous rod of fibrous material, or the tubular envelopes or discrete rod-shaped articles), and at least one perforating unit including at least one laser or another suitable source of coherent radiation (such radiation may constitute a laser beam, an ion beam or an electron beam), which is operable to emit at least one beam of coherent radiation, means for directing the beam against successive wrappers in the aforementioned path whereby the wrappers are perforated at the points of impingement of the beam with attendant increase in permeability, and means for operating the source of radiation in synchronism with the drive means to cause the beam to perforate selected portions of successive wrappers.

If the source of coherent radiation is installed in a machine for the production of plain cigarettes, cigars or cigarillos, in a machine for the production of filter rod sections, or in a machine for the production of filter cigarettes, cigars or cigarillos, the machine comprises means for draping the wrappers around the respective fillers and a source of web or ribbon of coherent wrappers (such web is thereupon severed to yield a succession of wrappers which may constitute uniting bands for attachment of filter plugs to plain cigarettes, cigarillos or cigars, or the web is severed subsequent to draping around a filter rod or a tobacco rod, i.e., subsequent to conversion into a tubular envelope or wrapper which surrounds a series of coherent fillers). The drive means then comprises means for advancing coherent wrappers from the source of web to the draping means, and the beam directing means is adjacent the path of coherent wrappers intermediate the source of the web and the draping means or adjacent the path of the continuous rod which is obtained upon draping of the web around the filler.

In either embodiment, the operating means preferably includes means for operating the radiation source a predetermined number of times per unit length of the web whereby each such unit length equals the length of a wrapper.

If the moving means comprises a conveyor which moves successive rod-shaped articles sideways, the conveyor preferably supports first portions of successive articles and leaves second portions of such articles unsupported. The beam directing means then preferably directs the beam or beams against the unsupported second portions of successive articles.

The machine preferably further comprises means (e.g., a variable resistor) for adjusting the intensity of the beam at the points of impingement to thus determine the size of perforations in the wrappers, and means for monitoring the permeability of wrappers downstream of the points of impingement as well as means (e.g., a servomotor) for actuating the adjusting means when the monitored permeability of wrappers deviates from a predetermined value.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an enlarged view of a detail in FIG. 1, showing a web perforating unit which is constructed and assembled in accordance with a first embodiment of the invention;

FIG. 3 is an enlarged view of a beam splitting device in the unit of FIG. 2;

FIG. 4 is a fragmentary plan view of a portion of the web with perforations which are formed by the unit of FIG. 2;

FIG. 5 is an enlarged view of a second detail in FIG. 1, showing a modified perforating unit which can be used in the machine of FIG. 1 to form perforations in the filter plugs of filter cigarettes;

FIG. 6 is an enlarged view of a beam splitting device in the unit of FIG. 5;

FIG. 8 is an enlarged view of a detail in the machine of FIG. 7, showing a perforating unit which can perforate a continuous web of cigarette paper;

FIG. 9 is an enlarged view of a beam splitting device in the unit of FIG. 8;

FIG. 10 is a plan view of a portion of the web which is perforated by the unit of FIG. 8;

FIG. 11 is a fragmentary partly sectional view of a second detail in the machine of FIG. 7, showing another perforating unit which can form perforations in the tubular envelope of a continuous cigarette rod; and FIG. 12 is an enlarged view of a beam splitting device in the unit of FIG. 11.

DESCRIPTION OF THE PREFERRED EMBODIMENTS

Figure 1:
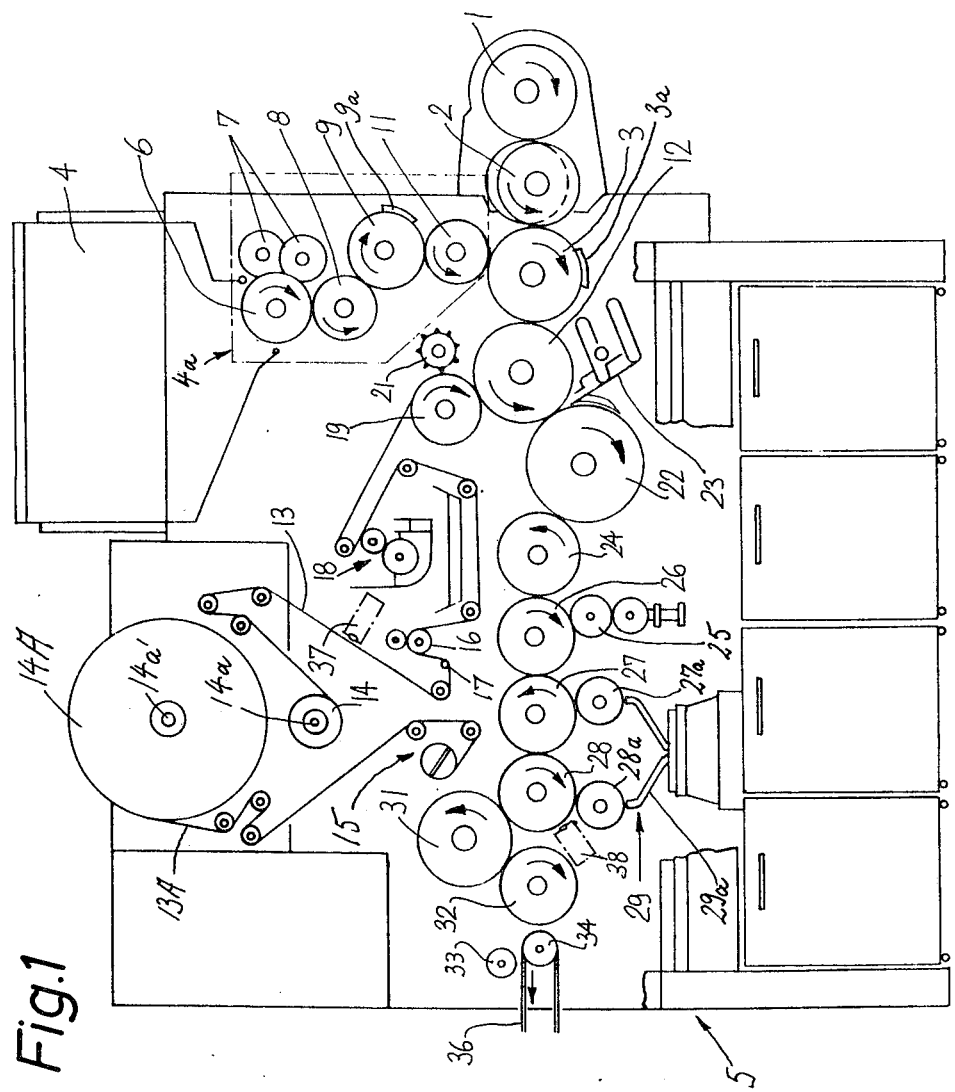
FIG. 1 is a schematic elevational view of a filter cigarette making machine which embodies the invention.

FIG. 1 shows a filter cigarette making machine of the type known as MAX-S produced by Hauni-Werke Körber & Co. KG., of Hamburg, Federal Republic of Germany. The machine of FIG. 1 is directly coupled to a machine which produces plain cigarettes of unit length, e.g., a machine of the type shown in FIG. 7. The cigarette making machine delivers plain cigarettes of unit length into successive flutes of a rotary drum-shaped row forming conveyor 1 wherein the cigarettes form two rows. The cigarettes of one row are received in the oddly numbered flutes and are adjacent one axial end, and the cigarettes of the other row are received in evenly numbered flutes and are adjacent the other axial end of the conveyor 1. The conveyor 1 delivers the two rows of cigarettes to two discrete rotary drum-shaped aligning conveyors 2 which are mounted in the frame 5 of the filter cigarette making machine and rotate at different speeds and/or transport the cigarettes of the respective rows through different distances so that each cigarette of one row is invariably aligned with a cigarette of the other row before the thus aligned cigarettes reach the transfer station between the conveyors 2 and a rotary drum-shaped assembly conveyor 3. The assembly conveyor 3 has flutes each of which receives a pair of spacedapart plain cigarettes of unit lengths, and the width of the gap between the cigarettes of each pair at least equals but preferably exceeds the length of a filter rod section or filter plug of double unit length.

The upper portion of the frame 5 supports a magazine or hopper 4 for filter rod sections of six times unit length. The outlet 4a of the magazine 4 is adjacent a rotary drum-shaped severing conveyor 6 having flutes which receive discrete filter rod sections of six times unit length and transport such sections past two rotary disk-shaped knives 7. Each filter rod section of six times unit length is severed twice to yield a group of three coaxial filter rod sections or filter plugs of double unit length. The filter plugs of each group are delivered to the flutes of three discrete rotary drum-shaped staggering conveyors 8 (only one shown in FIG. 1) which rotate at different speeds and/or transport the respective filter plugs through different distances so that the filter plugs of each group are staggered with respect to each other, as considered in the circumferential direction of the illustrated staggering conveyor 8, and these conveyors deliver the staggered filter plugs into successive flutes of a rotary drum-shaped shuffling conveyor 9 which cooperates with one or more stationary cams 9a to shift at least two filter plugs of each group axially into exact alignment with each other, i.e., the filter plugs which advance beyond the cams 9a form a single row wherein each preceding filter plug is in exact register with the next-following filter plug. The filter plugs of the thus obtained row are transferred into successive flutes of a rotary drum-shaped accelerating conveyor 11 which inserts successive filter plugs into successive flutes of the assembly conveyor 3 so that each filter plug enters the space corresponding to the gap between two aligned plain cigarettes of unit length. Thus, once a flute of the assembly conveyor 3 advances beyond the transfer station between the conveyors 2 and the conveyor 3, each such flute contains a group of three coaxial rod-shaped articles including two plain cigarettes of unit length and a filter rod section or filter plug of double unit length therebetween. These groups are caused to pass between two stationary cams 3a which move the plain cigarettes of each group axially toward and into abutment with the respective filter plug before the thus condensed groups are transferred into successive flutes of a rotary drum-shaped transfer conveyor 12.

The frame 5 further supports a spindle 14a for a source (roll 14) of convoluted web 13 of cigarette paper, imitation cork or other suitable wrapping material. The web 13 is trained over several guide rolls and around a curling device 17, preferably of the type disclosed in commonly owned U.S. Pat. No. 3,962,957 to Hinzmann. The web 13 thereupon passes through the nip of two advancing rolls 16 which constitute a drive means and at least one of which is driven by the prime mover of the machine. The other advancing roll 16 is biased against the one roll to move the web 13 lengthwise toward and beyond a paster 18 which coats one side of the web with a suitable adhesive. The leader of the web 13 adheres to and is advanced by a rotary suction drum 19 which cooperates with a rotary knife 21 to sever the leader at regular intervals so that the web 13 yields a succession of adhesive-coated uniting bands. Successive uniting bands are applied to successive groups of rod-shaped articles in the flutes of the transfer conveyor 12 in such a way that each uniting band adheres to the corresponding filter plug and to the inner end portions of the aligned plain cigarettes of unit length, and that the major portion of the uniting band extends substantially tangentially of the respective group. Such groups, each of which carries a uniting band, are transferred onto a rotary drum-shaped wrapping or draping conveyor 22 which cooperates with a stationary or mobile rolling or draping device 23 to roll successive groups of rod-shaped articles about their respective axes and to thus convert each such group into a filter cigarette of double unit length wherein the uniting band forms a tube draped around the corresponding filter plug and the adjacent inner end portions of the associated plain cigarettes of unit length.

The filter cigarettes of double unit length are thereupon transferred onto a rotary drum-shaped drying conveyor 24 which promotes the setting of adhesive at the inner sides of the tubes and delivers the filter cigarettes of double unit length into successive flutes of a rotary drum-shaped severing conveyor 26 cooperating with a rotary disk-shaped knife 25 to sever each filter cigarette of double unit length midway between its ends so that each such cigarette yields two coaxial filter cigarettes Z (see FIG. 2) of unit length (hereinafter called filter cigarettes for short). The filter plugs (of unit length) of each pair of aligned filter cigarettes Z are adjacent each other. In order to invert one filter cigarette Z of each pair, the severing conveyor 26 delivers successive pairs of aligned filter cigarettes into the flutes of a rotary drum-shaped conveyor 27 forming part of a turn-around device 29 of the type disclosed in commonly owned U.S. Pat. No. 3,583,546 to Koop. The conveyor 27 delivers one filter cigarette Z of each pair to a conveyor 28 and the other filter cigarette of each pair to a conveyor 27a. The conveyor 27a delivers successive filter cigarettes to successive orbiting inverting arms 29a which change the orientation of filter cigarettes by 180° and deliver them to the flutes of a rotary drum-shaped conveyor 28a. The conveyor 27 delivers non-inverted filter cigarettes into alternate flutes of the conveyor 28, and the conveyor 28a delivers inverted filter cigarettes into the other flutes of the conveyor 28 so that the latter carries a single row of filter cigarettes wherein all filter plugs face in the same direction. All rotary drum-shaped conveyors of the machine shown in FIG. 1 transport the respective rod-shaped articles sideways.

The conveyor 28 delivers the single row of filter cigarettes Z to a rotary drum-shaped testing conveyor 31 whereon the cigarettes are tested for the quality of their wrappers (presence or absence of open seams, holes or analogous defects). The conveyor 31 delivers filter cigarettes to a rotary drum-shaped conveyor 32 which is equipped with or cooperates with ejector means for segregating defective filter cigarettes from satisfactory filter cigarettes. Satisfactory filter cigarettes are transferred onto the upper reach of a belt conveyor 36 which is trained over pulleys 34 (one shown in FIG. 1) and delivers such cigarettes to storage, to a tray filling machine or directly to a packing machine, now shown. The illustrated pulley 34 for the belt conveyor 36 cooperates with a braking drum 33 for filter cigarettes.

A second spindle 14a' in the frame 5 supports a reel 14A of fresh web 13A. The leader of the fresh web 13A is held at a splicing station 15 which comprises means for attaching the leader of the web 13A to the running web 13 when the supply of web 13 is nearly exhausted. The exact nature of the mechanism at the splicing station 15 forms no part of the present invention.

The filter cigarette making machine of FIG. 1 further comprises novel and improved means for providing the wrappers of filter cigarettes Z with perforations. Such perforating means may include a first perforating unit 37 having a laser or an analogous source of coherent radiation which is adjacent the path of the web 13 intermediate the roll 14 and curling device 17 and/or a second perforating unit 38 which is adjacent the path of finished or partly finished articles, e.g., adjacent the conveyor 28 of the turn-around device 29. It will be recalled that the filter cigarettes Z in the flutes of the conveyor 28 travel sideways.

FIG. 2 shows the details of the perforating unit 37. The unit 37 comprises a suitable source 39 (e.g., a resonator) which furnishes a laser beam 40. The beam 40 is directed toward a device 41 which splits the beam into two discrete beams 40a, 40b (see FIG. 3) and focusses the beams upon the running web 13 which is thereby provided with perforations or holes 55 shown in FIG. 4. The device 41 comprises a partially light-transmitting mirror 42 which allows the beam 40a to pass and deflects the beam 40b against the reflecting surface of a mirror 44. The mirrors 42, 44 respectively direct the beams 40a, 40b against optical elements 43, 46 which focus the respective beams upon the adjacent surface of the running web 13. The intensity of the beam 40a may but need not equal the intensity of the beam 40b, i.e., the mirror 42 can reflect more or less than one-half of the original beam 40.

The reference character 47 denotes conductor means which supplies energy to the source 39. Such conductor means contains a switch 48 which constitutes an impulse generator. The means for operating the source 39 in synchronism with the advancing rolls 16 for the web 13 includes a control device 49 which comprises a pulse generator composed of a disk 51 driven in synchronism with the advancing rolls 16 for the web 13 and having projections 51a travelling past a proximity switch 52 which furnishes a pulse when approached by a projection 51a. The switch 52 then causes a servomotor 53 to close the switch 48 in the conductor means 47. In this manner, the perforating unit 37 provides the web 13 with two rows of holes 55. If desired, the device 41 of FIG. 3 can be replaced with a device which splits the beam 40 into three or more discrete beams so that the web 13 is formed with three or more rows of holes. The material of the wrappers of filter plugs and plain cigarettes is porous so that the provision of holes 55 in the web 13 (which is converted into uniting bands) increases the permeability of the wrapper of each filter cigarette Z of unit length in the region of the respective filter plug.

FIG. 2 further shows means for automatically adjusting the perforating unit 37 in response to monitoring of the permeability of wrappers on filter cigarettes Z of unit length. The testing conveyor 31 forms part of a testing apparatus 54 which further includes an electropneumatic transducer 57 serving to furnish electric signals which are indicative of permeability of the wrappers of successive filter cigarettes Z of unit length. The transducer 57 preferably comprises a membrane whose position varies in response to passage of a testing fluid through the wrapper of the cigarette Z at the testing station, and the position of the membrane is monitored by a capacitor. Reference may be had to commonly owned U.S. Pat. No. 3,412,856 to Esenwein. The transducer 57 receives pneumatic signals from a testing chamber 56 which is installed at the testing station, and the output of the transducer 57 transmits signals to an integrating circuit 58 which transmits signals to a signal comparing stage 61. The stage 61 has a second input which is connected with a source 59 of reference signals (e.g., an adjustable potentiometer). When the intensity of signal from the circuit 58 deviates from the intensity of signal from the source 59, the output of the stage 61 transmits a signal to a servomotor 62 which adjusts a variable resistor 63 in circuit with the switch 48 and energy source for the source 39 of coherent radiation. The arrangement is preferably such that the circuit 58 transmits a signal in response to reception of a plurality of signals from the transducer 57. The integrated signal which is transmitted from the circuit 58 to the state 61 is indicative of average permeability of several filter cigarettes Z, and the servomotor 62 adjusts the resistor 63 if the intensity of such integrated signal deviates from the intensity of the reference signal. The resistor 63 determines the quantity of energy which is supplied to the source 39 and hence the intensity of radiation (beam 40). Such intensity determines the diameters of holes 55 which are formed in the running web 13. The primary purpose of adjusting means 63 for the laser 39 is to insure that the permeability of the wrappers of cigarettes Z does not decrease or remain below a predetermined minimum value.

FIG. 3 further shows a slight modification of the adjusting means. The servomotor 62 is connected with a carriage or another mobile support 64 for the optical elements 43 and 46. When the servomotor 62 receives a signal from the output of the signal comparing stage 61, it causes the carriage 64 to move toward or away from the path of the running web 13 to thereby change the size of holes 55 by shifting the focal plane of the optical elements. The directions in which the carriage 64 can be shifted by the servomotor 62 are indicated by a double-headed arrow.

It is further clear that the control device 49 can be modified to operate the source 39 in a different way. For example, the switch 48 can be replaced with a mask which has apertures for the beams 40a, 40b and is movable tramsversely of the path of such beams to place the apertures into register with the beams at intervals determined by the pulse generator 51, 52. Furthermore, the source 39 can be installed in the interior of a perforated drum or roller over which the web 13 is trained and which determines the size of holes 55 as well as the number and distribution of such holes in the running web. Still further, the unit 37 may comprise means for varying the number of holes in successive unit lengths (uniting bands) of the web 13 for the purpose of regulating the porosity of wrappers of the respective cigarettes Z.

FIG. 5 illustrates the details of the perforating unit 38 of FIG. 1. This unit includes a source 139 of coherent radiation, which is a laser, and a beam splitting device 166 the details of which are shown in FIG. 6. The device 166 comprises a partially light-transmitting mirror 167 which divides the incoming beam 140 into beams 140a, 140b. The beam 140a is reflected by mirrors 168, 169, 171 and is focussed on the filter plugs FP of successive filter cigarettes Z by an optical system 172. The beam 140b is reflected by mirrors 173, 174 and is focussed on the filter plugs FP by an optical system 176. FIG. 6 further shows that the conveyor 28 supports the cigarettes Z in such a way that a first portion of each cigarette is supported in the respective flute 28a (FIG. 5) but a second portion (including the filter plug FP) remains unsupported. The beams 140a, 140b impinge upon diametrically opposite sides of successive filter plugs FP.

The pulse generator of the control unit 149 which operates the source 139 in synchronism with the drive means (conveyor 28) for the filter cigarettes Z includes a disk 151 on the shaft 28b of the conveyor 28, projections 151a at the periphery of the disk 151, a proximity switch 152 which transmits signals when approached by successive projections 151a, and a servomotor 153 for the impulse generator (not shown) in the circuit of energy source for the laser 139.

The means for monitoring the permeability of filter cigarettes Z downstream of the conveyor 28 is analogous to the monitoring means of FIG. 2 and its component parts are denoted by similar reference characters plus 100. The adjusting means including the servomotor 162 receives a postive or negative signal whenever the intensity of signal from the integrating circuit 158 to the signal comparing stage 161 deviates from intensity of reference signal which is furnished by the source 159. The servomotor 162 then effects a change in the intensity of coherent beam 140 to increase or reduce the size of perforations which are formed by the beams 140a, 140b.

The device 166 can be modified to split the beam 140 into three or more beams so that each filter plug FP is formed with more than two perforations.

Furthermore, the perforating unit 38 can be installed adjacent a portion of the path wherein the filter cigarettes Z move sideways and simultaneously rotate about their respective axes so that each of the beams 140a, 140b forms an elongated slot-shaped hole. Also, the beams 140a, 140b can be directed against successive articles Z while the articles are at a standstill or when the articles do not move sideways or axially but rotate. For example, the unit 38 can be installed adjacent the gap between the belt 36 and the braking drum 33.

Figure 7:
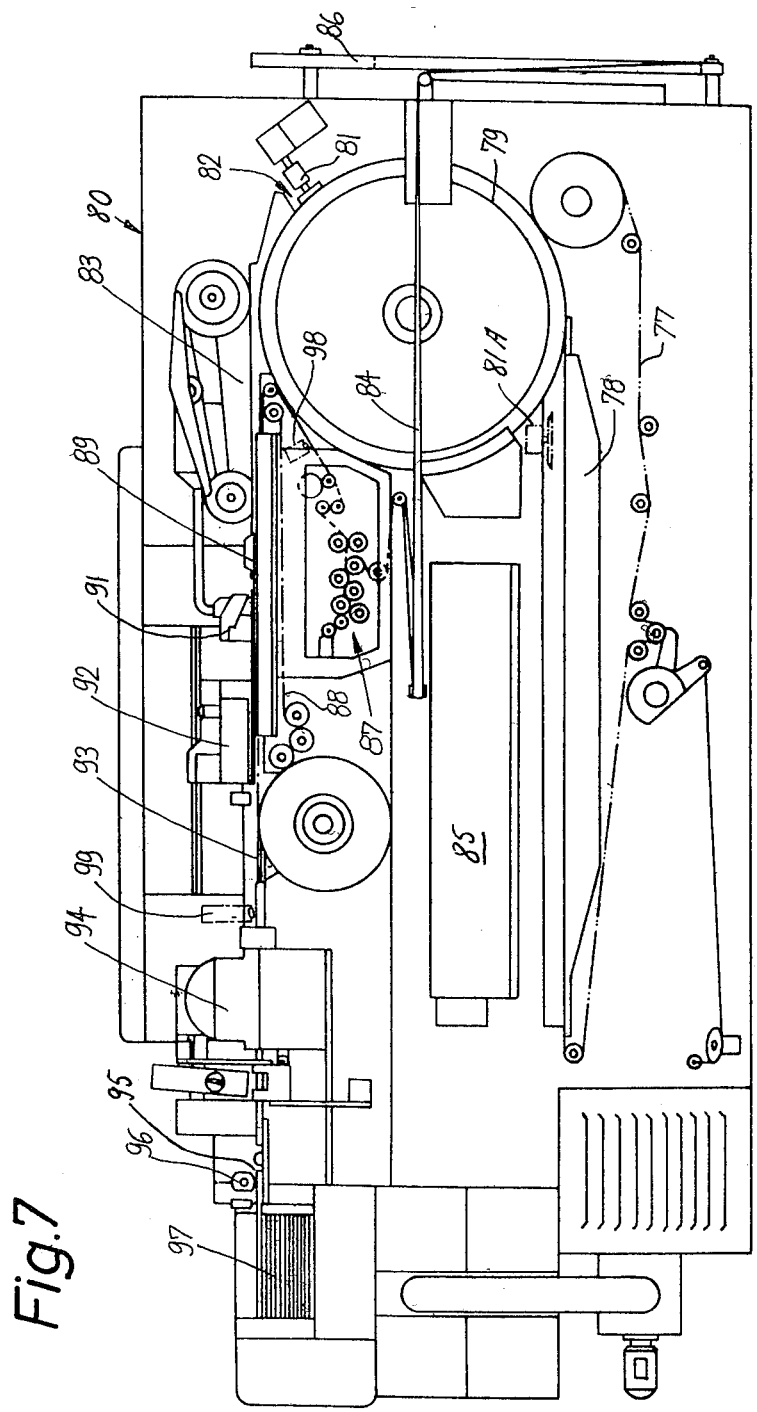
FIG. 7 is a schematic elevational view of a ciagarette making machine which embodies the invention.

FIG. 7 illustrates a machine, known as GARAN (trademark) manufactured by Hauni-Werke Körber Co. KG., Hamburg, Federal Republic Germany, whi produces plain cigarettes 95 of unit length. The machi comprises a frame 80 which supports a distributor serving to shower the leading edge of a wide sliver of tobacco shreds onto the upper reach of an endless tobacco stream forming belt conveyor 77. The upper reach of the conveyor 77 travels above the perforated top wall of a suction chamber 78 which attracts the shreds and causes them to form a growing tobacco stream which advances in a direction to the right, as viewed in FIG. 7. The upper side of the fully grown tobacco stream can be trimmed by a first equalizing device 81A (indicated by phantom lines) before the stream enters the circumferential groove of a rotary suction wheel 79. The bottom wall of the groove in the periphery of the wheel 79 surrounds a suction chamber which attracts the once-trimmed stream during transport past a second equalizing device 81 which trims the other side of the stream and converts it into a rod-like filler 82 which is removed from the wheel 79 by a pneumatic transfer conveyor 83 and delivered onto a continuous web 84 of cigarette paper. The web 84 is withdrawn from a reel 86 by a pair of advancing rolls (not shown) and passes through an imprinting mechanism 87 which provides spaced-apart portions of the web with indicia representing the trademark of the manufacturer, the name of the manufacturer, the brand name of the cigarettes and/or other information. The web 84 thereupon advanced toward and is entrained by the upper reach of an endless band conveyor 88 known as garniture. The latter transports the web 84 and the filler 82 through a wrapping mechanism 89 which drapes the web around the filler in such a way that one marginal portion of the web extends tangentially of the filler and can be coated with adhesive during travel along a suitable paster 91. The thus coated marginal portion is then folded over the other marginal portion of the web 84 to form therewith the longitudinally extending seam of the resulting tubular wrapper forming part of a continuous cigarette rod 93. The seam is heated or cooled by a sealer 92, depending upon whether the adhesive which is applied by the paster 91 is a wet adhesive or a hot-melt. The rod 93 is severed at regular intervals by a cutoff 94 so that it yields a single file of plain cigarettes 95 of unit length which are accelerated by a rapidly rotating cam 96 so as to enter successive flutes of a rotary drum-shaped row forming conveyor 97 corresponding to the conveyor 1 of FIG. 1.

The machine of FIG. 7 further comprises a perforating unit 98 including a laser which is adjacent the path of movement of the web 84 between the imprinting mechanism 87 and the right-hand end turn of the garniture 88 and/or a perforating unit 99 which is adjacent the path for the cigarette rod 93 between the sealer 92 and the cutoff 94.

The perforating unit 98 is shown in detail in FIGS. 8 and 9. This unit is adjacent the path of coherent wrappers, i.e., to the path of the web 84 prior to subdivision of this web into discrete wrappers of plain cigarettes 95. All such parts of the perforating unit 98 which are identical with or clearly analogous to those shown in FIGS. 2 and 3 are denoted by similar reference characters plus 200. The unit 98 comprises a source 239 of coherent radiation (preferably a laser) and a beam splitting device 101 which comprises three partially light-transmitting mirrors 102, 103, 104 and a reflecting mirror 106. The beams 240a, 140b, 240c, 240d which are respectively reflected by mirrors 102, 103, 104, 106 are focussed upon the running web 84 by optical systems 107, 108, 109, 111 so that the unit 98 provides longitudinally spaced portions of the web 84 with transversely extending rows of four perforations or holes 255 each (see FIG. 10). The light-transmissivity of mirrors 102, 103, 104 is selected in such a way that the intensity of each of the beams 140a-140d is preferably (but not necessarily) the same.

The control means 249 for operating the laser 239 at such intervals that each unit length of the web 84 is provided with a predetermined number of perforations or holes 255 includes a timer disk 251 having projections 251a and receiving torque from a drive 251b, e.g., the shaft for one of the conveyors shown in FIG. 7. The projections 251a travel past a proximity switch 252 which transmits signals to a servomotor 253 for an impulse generator (not shown) in the same way as described in connection with FIG. 2. The distribution of projections 251a on the disk 251 is such that each unit length of the web 84 is formed with two rows of perforations 255 close to one end of such unit length (each unit length corresponds to the length of a plain cigarette 95) so that the perforations are adjacent to that end of a filter cigarette Z (see FIG. 8) which is disposed next to the corresponding filter plug FP. This can be readily achieved by arranging the projections 251a in pairs so that the circuit of the laser 239 is completed twice in rapid sequence and thereupon remains open for a longer interval of time.

The monitoring and adjusting means of FIG. 8 are identical with those shown in FIG. 2. Thus, the monitoring means 254 monitors the permeability of wrappers of filter cigarettes Z (the plain cigarettes 95 which are produced in the machine of FIG. 7 are assumed to be fed into the machine of FIG. 1) so that a single testing unit suffices to detect defective articles Z as well as to cause the adjusting means (including the servomotor 262 of FIG. 8) to adjust the intensity of the beam 240 whenever the monitored permeability of a series of satisfactory articles Z (see the integrating circuit 258) deviates from a predetermined value selected by the setting of the potentiometer 259.

The perforating unit 99 of FIG. 7 is shown in detail in FIGS. 11 and 12. This unit is adjacent the path of coherent wrappers, i.e., it is located upstream of the cutoff 94 which subdivides the continuous wrapper or envelope of the cigarette rod 93 into discrete plain cigarettes 95. All such parts of this unit which are identical with or clearly analogous to the corresponding parts of the unit 37 are denoted by similar reference characters plus 300. The guide 100 for the rod 93 has a cutout 100a which is in register with a beam splitting device 112 of the unit 99. The beam 340 which issues from the laser 339 is split into three discrete beams 340a, 340b, 340c by the mirrors 113, 114, 118, 119, 116, 117 of FIG. 12, and the beams 140a, 140b, 140c are respectively focussed by optical systems 121, 123, 122 to impinge upon the continuous tubular wrapper or envelope of the rod 93 so as to form therein groups of three rows of perforations 355 whereby each row comprises three perforations. The shaft 351b of the disk 351 for projections 351a receives torque from the main prime mover of the machine of FIG. 7; for example, the shaft 351b can drive one of the pulleys for the garniture 88. This insures that the operation of the laser 339 is synchronized with movement of the rod 93 through the cigarette making machine.

The projections 351a are disposed in groups of three so that the laser 339 receives three successive impulses at short intervals and is thereupon idle for a longer interval. This insures that each unit length of the envelope of the rod 93 is provided with three rows of perforations 355 close to one axial end of such unit length.

Each unit length of the rod 93 corresponds to the length of a plain cigarette 95.

It is clear that the perforating unit 98 and/or 99 can be used with equal advantage in a filter rod making machine wherein a tow of filamentary filter material or another filler which intercepts deleterious ingredients of tobacco smoke is draped into a web of cigarette paper, imitation cork or the like. The same applies for the perforating unit 37 and/or 38. Thus, wrappers of filter rod sections can be perforated by resorting to beams of coherent radiation prior to draping of the web about the filler, subsequent to draping (i.e., while the web and the filler form a continuous rod) or subsequent to subdivision of the rod into discrete rod-shaped articles.

The adjusting and monitoring means of FIG. 11 are analogous to those shown in FIG. 8. The monitoring means 354 operates with compressed air and the servomotor 362 of the adjusting means is actuated to change the intensity of the beam 340 when the intensity of the reference signal (potentiometer 359) deviates from intensity of signal at the output of the integrating circuit 358.

An important advantage of the improved apparatus is that the wear upon the means for forming holes in the wrappers of rod-shaped smokers' products is non-existent or negligible because the perforating units do not have any mechanical parts which come into physical contact with the articles. Furthermore, and since the perforating units are installed directly in the respective machines, the webs or wrappers can be perforated in a manner and to an extent which is desired for the particular type of articles produced. Still further, the improved perforating units can be adjusted with a high degree of accuracy and reproducibility to thus insure that the permeability of each and every wrapper matches or closely approximates an optimum value. The adjustment can be effected by varying the size and/or distribution of holes in the wrappers. Moreover, the perforating units can be readily adjusted or modified to perforate selected portions of wrappers.

The laser or lasers which are used in the machines of the present invention are preferably $CO_2$ lasers. The diameters of the holes in the webs or wrappers may be in the range of 0.1-0.4 millimeter. When the holes are made directly in the filter plugs, the porosity of the wrappers of filter plugs and/or cigarette paper is of no consequence because the laser beams can burn holes through the uniting bands as well as through the filter plug wrappers. Analogously, the material of cigarette paper need not be porous when the laser beams make holes in the web 84.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. In a machine for the production and/or processing of rod-shaped articles which constitute or form part of smokers' products and wherein a wrapper surrounds a rod-like filler, a combination comprising drive means for moving a succession of wrappers along a predetermined path; at least one source of coherent radiation operable to emit at least one beam of coherent radiation; means for directing said beam against successive wrappers in said path whereby the wrappers are perforated at the points of impingement of said beam; means for operating said source in synchronism with said drive means to cause said beam to perforate selected portions of successive wrappers; means for adjusting the intensity of said beam at said points of impingement to thereby vary the size of perforations of said wrapper; means for monitoring the permeability of wrappers downstream of said points of impingement; and means for actuating said adjusting means when the monitored permeability deviates from a predetermined value.

2. A combination as defined in claim 1, further comprising means for draping said wrappers around the respective fillers and a source of a web of coherent wrappers, said drive means including means for advancing said web from said source of said web to said draping means, said beam directing means being adjacent the path of said web intermediate said source of said web and said draping means.

3. A combination as defined in claim 2, wherein said operating means includes means for operating said source of coherent radiation a predetermined number of times per unit length of said web, each such unit length being equal to the length of a wrapper.

4. Apparatus as defined in claim 1, wherein said source is a laser.

5. Apparatus as defined in claim 1, wherein said beam directing means includes means for splitting coherent radiation issuing from said source into a plurality of discrete beams.

6. In a machine for the production and/or processing of rod-shaped articles which constitute or form part of smokers' products and wherein a wrapper surrounds a rod-like filler, a combination comprising drive means for moving a succession of wrappers along a predetermined path; at least one source of coherent radiation operable to emit at least one beam of coherent radiation; means for directing said beam against successive wrappers in said path whereby the wrappers are perforated at the points of impingement of said beam, said drive means including conveyor means for moving a succession of rod-shaped articles sideways along said path and past said beam directing means; and means for operating said source in synchronism with said drive means to cause said beam to perforate selected portions of successive wrappers, said operating means including means for operating said radiation source at least once whenever an article moves past said beam directing means so that the beam impinges upon and perforates the wrapper of such article.

7. A combination as defined in claim 6, wherein said conveyor means includes means for supporting first portions of successive articles while leaving a second portion of each article unsupported, said beam directing means being adjacent the path of movement of second portions of successive articles.

8. A combination as defined in claim 6, further comprising means for adjusting the intensity of said beam at said points of impingement to thereby vary the size of perforations in said wrappers.

9. A combination as defined in claim 8, further comprising means for monitoring the permeability of wrappers downstream of said points of impingement and means for actuating said adjusting means when the monitored permeability deviates from a predetermined value.

10. In a machine for the production and/or processing of rod-shaped articles which constitute or form part of smokers' products and wherein a wrapper surrounds a rod-like filler, a combination comprising drive means for moving a succession of wrappers along a predetermined path, said drive means including means for moving a continuous rod or coherent articles along said path; at least one source of coherent radiation operable to emit at least one beam of coherent radiation; means for directing said beam against successive wrappers in said path whereby the wrappers are perforated at the points of impingement of said beam; and means for operating said source in synchronism with said drive means to cause said beam to perforate selected portions of successive wrappers, said operating means including means for operating said radiation source a predetermined number of times per unit length of said rod, each such unit length being equal to the length of an article.

11. In a machine for the production and/or processing of rod-shaped articles which constitute or form part of smokers' products and wherein a wrapper surrounds a rod-like filler, a combination comprising drive means for moving a succession of wrappers along a predetermined path; at least one source of coherent radiation operable to emit at least one beam of coherent radiation; means for directing said beam against successive wrappers in said path whereby the wrappers are perforated at the points of impingement of said beam, said beam directing means comprising adjustable focusing means; means for operating said source in synchronism with said drive means to cause said beam to perforate selected portions of successive wrappers; means for monitoring the permeability of wrappers downstream of said points of impingement; and means for adjusting said focusing means when the monitored permeability deviates from a predetermined value.

* * * * *